United States Patent [19]

Furukawa

[11] Patent Number: 4,815,031

[45] Date of Patent: Mar. 21, 1989

[54] METHOD FOR GRANTING A REQUEST TO AUTHORIZED DATA TERMINAL USERS ACCESSING FROM ANY LOCATIONS

[75] Inventor: Noriyuki Furukawa, Tokyo, Japan

[73] Assignee: NEC Corporation, Tokyo, Japan

[21] Appl. No.: 902,841

[22] Filed: Sep. 2, 1986

[30] Foreign Application Priority Data

Sep. 2, 1985 [JP] Japan ................................ 60-191855

[51] Int. Cl.⁴ ...................... G06F 15/16; G06F 13/14; H04L 9/00
[52] U.S. Cl. .................................... 364/900; 379/88; 379/95; 379/94; 380/23
[58] Field of Search ... 364/200 MS File, 900 MS File; 340/825.34; 379/95, 40, 245

[56] References Cited

U.S. PATENT DOCUMENTS

| | | | |
|---|---|---|---|
| 3,746,797 | 7/1973 | Meise, Jr. et al. | 379/246 |
| 3,922,498 | 11/1975 | Aul et al. | 379/246 |
| 3,973,090 | 8/1976 | Miller | 379/246 |
| 4,051,326 | 9/1977 | Badagani et al. | 364/900 |
| 4,160,124 | 7/1979 | Law | 364/900 |
| 4,215,243 | 7/1980 | Maxwell | 364/200 |
| 4,218,738 | 8/1980 | Matyas et al. | 364/200 |
| 4,225,918 | 9/1980 | Beadle et al. | 364/200 |
| 4,310,720 | 1/1982 | Check, Jr. | 364/900 |
| 4,313,176 | 1/1982 | Cecil | 364/900 |
| 4,335,446 | 6/1982 | Gandini et al. | 364/900 |
| 4,349,695 | 9/1982 | Morgan et al. | 340/825.34 |
| 4,356,545 | 10/1982 | West | 364/200 |
| 4,387,440 | 6/1983 | Eaton | 364/900 |
| 4,430,728 | 2/1984 | Beitel et al. | 340/825.34 |
| 4,442,502 | 4/1984 | Friend et al. | 364/900 |
| 4,484,306 | 11/1984 | Kulczyckj et al. | 364/900 |
| 4,486,828 | 12/1984 | Kitamura et al. | 364/200 |
| 4,511,970 | 4/1985 | Okano et al. | 364/900 |
| 4,520,233 | 5/1985 | Smith | 379/95 |
| 4,531,023 | 7/1985 | Levine | 364/900 |
| 4,554,418 | 11/1985 | Toy | 364/900 |
| 4,580,239 | 4/1986 | Greenhill et al. | 364/900 |
| 4,601,011 | 7/1986 | Grynberg | 379/95 |
| 4,672,653 | 6/1987 | Loveless | 379/40 |
| 4,672,660 | 6/1987 | Curtin | 379/245 |
| 4,679,236 | 7/1987 | Davies | 235/380 |
| 4,733,345 | 3/1988 | Anderson | 364/200 |

FOREIGN PATENT DOCUMENTS

| | | | |
|---|---|---|---|
| 2533699 | 2/1977 | Fed. Rep. of Germany | 379/95 |
| 2939041 | 4/1981 | Fed. Rep. of Germany | 379/95 |
| 0187060 | 11/1983 | Japan | 379/95 |
| 0113567 | 6/1985 | Japan | 379/95 |

OTHER PUBLICATIONS

IBM Technical Disclosure, "Location Identification to Prevent Unauthorized, User-Implemented Dial-In Ports to Computers", vol. 30, No. 3, 8/87, pp. 1047–1050.

Jim Holmes, "Securing Dial-Up Networks", Telecommunications, Mar. 1984, pp. 84, 124.

Glasgal Communications, Inc., "Password Security Equipment", Aug. 1985, pp. 68–72.

Primary Examiner—Thomas M. Heckler
Assistant Examiner—Viet Q. Nguyen
Attorney, Agent, or Firm—Sughrue, Mion, Zinn, Macpeak & Seas

[57] ABSTRACT

In a data communication system, plural telephone lines are divided into a registered group and a non-registered group. Authorized remote terminals are respectively associated with the telephone lines of the registered group. Each remote terminal transmits a password when it accesses to the central station from the associated, registered telephone line. The password is appended with an extra code when the access is made from a non-registered telephone line. The registered telephone numbers and the passwords of the associated remote terminals are stored in a memory. A coincidence between the password transmitted from a remote terminal and a stored password is detected to proceed with the detection of whether the transmitted password is appended with an extra code or not. In the absence of the extra code, the central station calls back the remote terminal using a telephone number stored in the memory in association with the transmitted password. If an extra code is appended, the remote terminal is requested to inform the central station of the non-registered telephone number to allow it to call back the remote terminal.

2 Claims, 3 Drawing Sheets

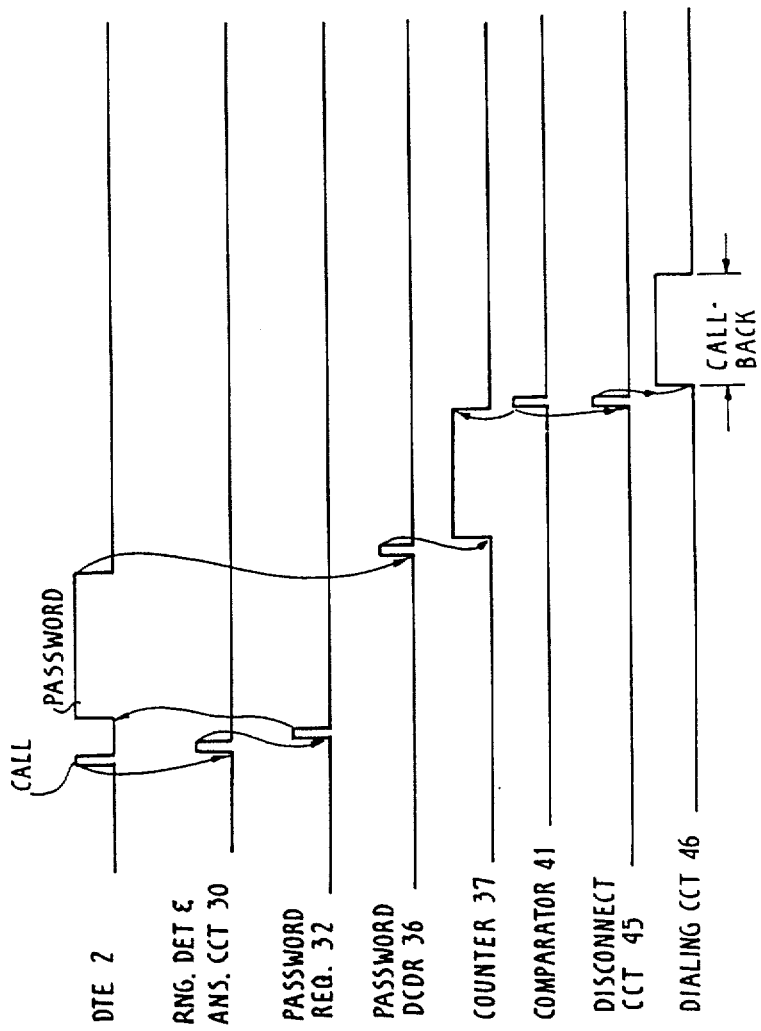

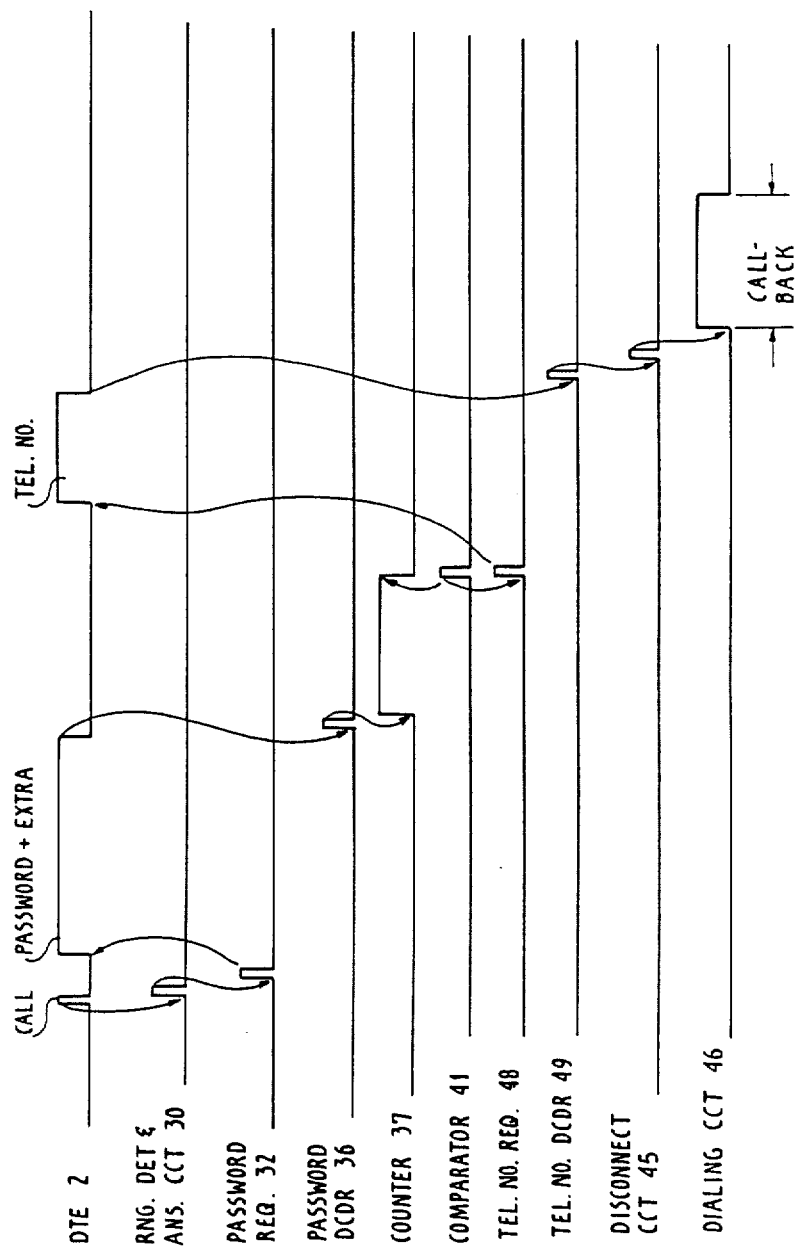

METHOD FOR GRANTING A REQUEST TO AUTHORIZED DATA TERMINAL USERS ACCESSING FROM ANY LOCATIONS

BACKGROUND OF THE INVENTION

The present invention relates to a data communication system, and more specifically to a method for granting a request to authorized data terminal users accessing from any locations to a central station.

In conventional data communication systems in which requests for access are granted only to authorized terminal users, the telephone numbers of such authorized users and their passwords are registered in the central station and the users are requested to send the associated passwords to the central station for verification of the password and if the password is verified the central station proceeds to call back the calling party by dialing the registered telephone number.

Advances in electronic technolgy have resulted in compact terminal equipments which can be hand carried to any location which is accessible through a telephone switching network to a desired central station. However, the telephone line terminal of the new location is not necessarily registered in the central station and the latter's callback attempt thus fails to reestablish a connection.

SUMMARY OF THE INVENTION

It is therefore an object of the present invention to provide a method for securing access to authorized data terminal users from any locations.

This object is obtained by dividing a plurality of telephone lines into a first group which is registered in a central station and a second group which is not registered. Authorized remote terminals are respectively associated with the telephone lines of the first group. Each of the remote terminals transmits a password when it accesses to the central station from the associated telephone line and transmits the password appended with an extra code when access is made from a telephone line of the second group. The telephone numbers of the first group and the passwords of the associated remote terminals are stored in a memory. A coincidence between the password transmitted from one of said remote terminals and the password of the calling remote terminal stored in the memory is detected to proceed with the detection of whether the transmitted password is appended with said extra code or not. If the transmitted password is not appended with the extra code, the communication path between the remote terminal and the central station is disconnected and the telephone number stored in the memory in association with the transmitted password is transmitted from the central station to the switching network to call back the remote terminal. If the transmitted password is appended with an extra code, the calling remote terminal is requested to transmit to the central station the telephone number of the second group telephone line from which a call is being made and the communication path is disconnected upon the reception of the telephone number to allow the central station to dial the received telephone number to call back the remote terminal.

BRIEF DESCRIPTION OF THE DRAWINGS

The present invention will be described in further detail with reference to the accompanying drawings, in which:

FIG. 2 is a timing diagram associated with FIG. 1 when a remote terminal accessed to the central station from a telephone line registered in the central station; and FIG. 3 is a timing diagram associated with FIG. 1 when the remote terminal accessed to the central station from a telephone line not registered in the central station.

DETAILED DESCRIPTION

Figure 1:
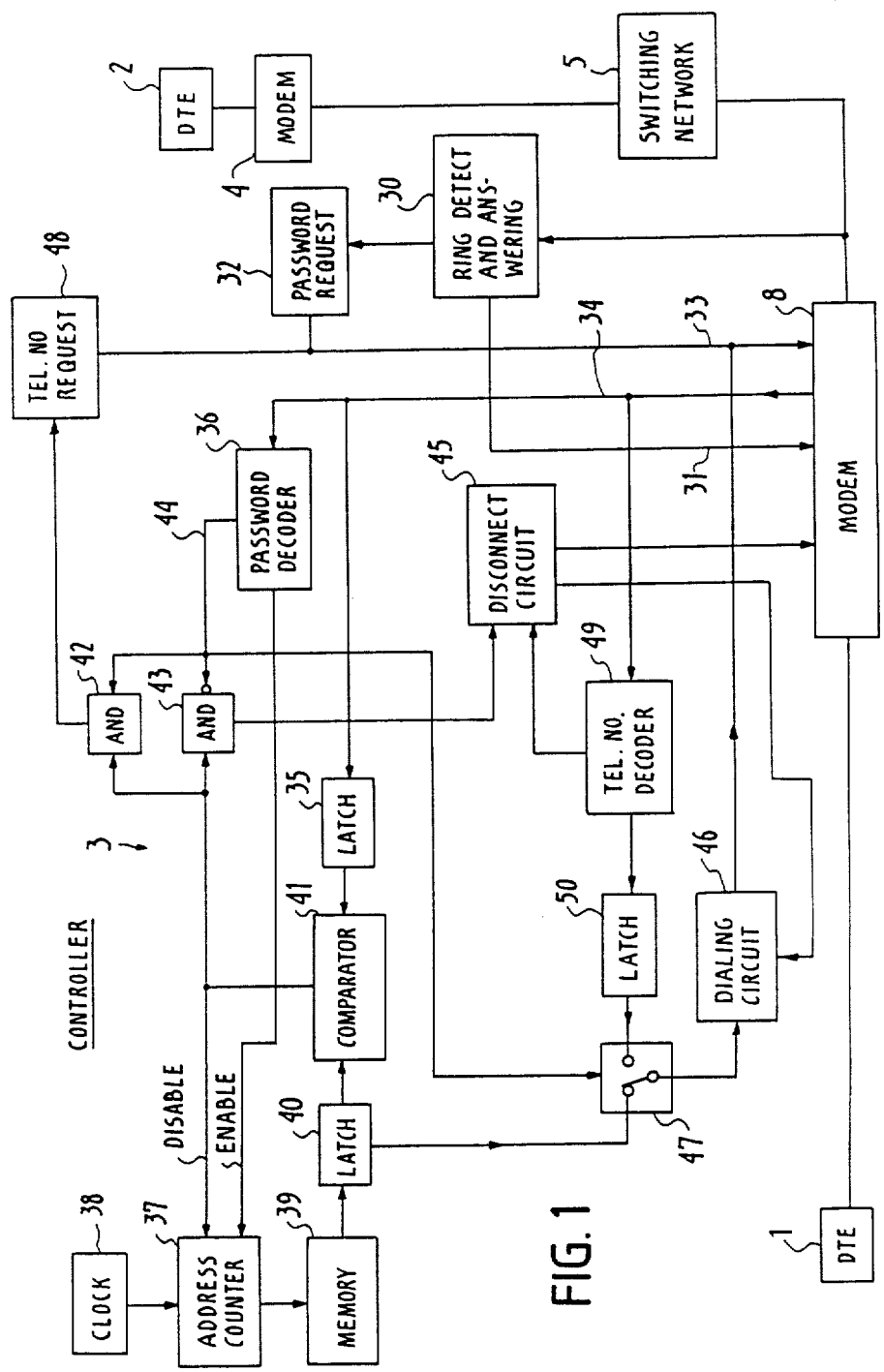
FIG. 1 is a block diagram of a data communication system embodying the present invention.

In FIG. 1, there is shown a data communication system embodying the present invention. A central station data terminal equipment 1 is coupled through a modulator-demodulator (modem) 8 to a switching network 5. A remote data terminal equipment 2 is also coupled through a modem 4 to the switching network 5. Many of such remote terminals are coupled to the switching network 5. For simplicity, only one remote terminal is shown. Switching network 5 provides switched connection in response to dialed information between the central station and a remote terminal. Each of the remote data terminals has its own identifying access code, or telephone number and an associated password. Under normal operations, the password is sufficient to allow the central station to call back an authorized remote terminal if it has accessed to it over a telephone line which is registered in the central station. If the remote terminal is of a portable type, circumstances may arise in which it accesses to the central station through a telephone line which is not registered in the central station. To allow the remote terminal to establish a communication from such non-registered telephone lines, the remote terminal generates an extra code appending to an associated password in order to indicate that the remote data terminal is wishing to gain access to the center from a non-registered telephone line.

In accordance with the present invention, a controller 3 allows such remote data terminals to establish a communication with the central station data terminal over a telephone line not registered in the central station.

Controller 3 comprises a ring detect and answering circuit 30 which detects a ringing signal from the switching network 5 and answers the call from the remote terminal 2 by notifying the modem 8 on a line 31 to cause the switching network 5 to halt the ringing signal and complete a connection between telephone lines 6 and 7. Ring detect and answering circuit 30 causes a password request circuit 32 to place a request on a line 33 which is coupled through modem 8 to the remote terminal 2. Remote terminal 2 then sends back an associated password through the switching network 5 to the modem 8 which couples it to a line 34. The password is stored into a latch 35 and is detected by a password detector 36. Upon detection of the password, the password detector 36 applies an enable command to an address counter 37 to enable it to initiate a count operation by which it increments its address value in response to a clock pulse from a clock source 38. The incremental address is applied to a directory memory 39 which stores passwords and associated telephone numbers. The stored contents of the memory 39 are sequentially read out as a function of the incremental address into a latch 40 and compared with the password stored in latch 35 by a comparator 41. Comparator 41 generates a coincidence output when the outputs of latches 35 and 40 coincide with each other. The coincidence output disables the address counter 37 and enables AND gates 42 and 43. If the password is appended with no extra code, password decoder 36 places a low-level output on a line 44 and if appended with an extra code, it applies a high-level output on line 44.

Therefore, if the call is placed from a registered telephone line, there is no extra code and the line 44 is at low output state. Thus, AND gate 43 produces a high-level output and applies it to a disconnect circuit 45. Disconnect circuit 45 causes the modem 8 to disconnect the connection between terminals 1 and 2 and, after the connection has been completely disconnected, causes a dialing circuit 46 to receive a telephone number associated with the password from the latch 40 through a switching gate 47 and call back the calling remote terminal by sending the telephone number to the switching network 5.

If the call is originated from a non-registered telephone set using an acoustic coupler, for example, an extra code is keyed in by remote terminal and appended to the password. Password detector 36 thus applies a high-level output to line 44, causing AND gate 42 to produce a high-level output which enables a telephone-number request circuit 48 to apply a request signal on line 33 to cause the modem 8 to request the user terminal to send the non-registered telephone number. The non-registered telephone number is received by a telephone number decoder 49 and stored into a latch 50. Disconnect circuit 45 responds to the reception of the non-registered telephone number to send a disconnect signal to the modem 8 to disconnect the connection to call back the remote terminal. This is achieved by controlling the switching gate 47 to couple the input of dialing circuit 46 to the output of latch 50.

The present invention will be fully understood with reference to FIGS. 2 and 3.

In FIG. 2, when the remote data terminal has originated a call from a registered telephone line to the central station 1 through switching network 5, ring detect and answering circuit 30 is activated in response thereto and a password request signal is sent to the remote terminal from the password request circuit 32. A password with no extra code appended to it is sent to the latch 35 and password decoder 36. When decoder 36 detects the received password, the counter 37 is enabled to sequentially read out the directory memory 39 until the comparator 41 detects a coincidence between the password stored in latch 35 and the password read out of the memory. AND gate 43 is activated to operate the disconnect circuit 45 for disconnection and the dialing circuit 46 is subsequently activated to call back the remote terminal using the telephone number which has been stored in latch 40 with the password.

In FIG. 3, when the remote data terminal has originated a call from a non-registered telephone line, it sends a password and an extra code signifying that the telephone being used is not registered. When decoder 36 detects the received password plus the extra code, the counter 37 is enabled by decoder 36 to sequentially read out the directory memory 39 until the comparator 41 detects a coincidence between the password stored in latch 35 and the password read out of the memory. Password detector 36 places a high level output which activates AND gate 42 and switching gate 47. Telephone number request circuit 48 is enabled to request the remote terminal to send the non-registered telephone number, which is received and decoded by telephone number decoder 49 and stored into latch 50. Disconnect circuit 45 is enabled by the decoder 49 upon the reception of the non-registered telephone number to disconnect the connection between terminals 1 and 2 to permit the dialing circuit 46 to call back the remote terminal using the telephone number received from latch 50 through the activated switching gate 47.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for granting an access request to authorized users in a data communication system, the data communication system including a switching network having a plurality of telephone lines for establishing a communication path between a central station and one of a plurality of remote terminals of the authorized users, said telephone lines being divided into a first group and a second group, each of said remote terminals transmitting a particular password when accessing through a telephone line of said first group and transmitting said password appended with an extra code when accessing through a telephone line of the second group, said method comprising the steps of:
   storing in a memory a plurality of telephone numbers of the first group telephone lines and a plurality of passwords associated respectively with the telephone numbers of the first group telephone lines;
   detecting a coincidence between the password transmitted from one of said remote terminals and one of said passwords stored in said memory;
   if said coincidence is detected, detecting whether said transmitted password is appended with said extra code;
   if said transmitted password is not appended with said extra code, disconnecting said communication path and reestablishing a communication path between said central station and said one remote terminal through said switching network in accordance with the telephone number stored in said memory in association with said password:
   if said transmitted password is appended with said extra code, requesting said one remote terminal to transmit the telephone number of the second group telephone line through which said one remote terminal is accessing said switching network;
   reeiving the transmitted telephone number; and
   disconnecting the communication path upon the reception of the transmitted telephone number and reestablishing a communication path between said central station and said one remote terminal through said switching network in accordance with the received telephone number.

2. A data communication system comprising:
   a switching network having a plurality of telephone lines through which remote terminals are respectively accessible thereto for establishing a communication path between a central station and one of said remote terminals, said telephone lines being divided into a first group and a second group, each of said remote terminals transmitting a particular password when accessing through a telephone line of the first group and transmitting said password appended with an extra code when accessing through a telephone line of the second group:

a memory for storing a plurality of telephone numbers of the first group telephone lines and a plurality of passwords associated respectively with the telephone numbers of the first group telephone lines;

means for detecting a coincidence between the password transmitted from one of said remote terminals and one of said passwords stored in said memory and detecting whether said transmitted password is appended with said extra code upon detection of the coincidence;

means for causing said switching network to disconnect said communication path when said password is not detected as being appended with the extra code and sending the telephone number stored in said memory in association with the transmitted password to said switching network to cause it to reestablish a communication path to said one remote terminal;

means for requesting said one remote terminal to transmit the telephone number of the second group telephone line through which said one remote terminal is accessing the switching network when said password is detected as being appended with said extra code;

means for receiving the requested telephone number and causing said switching network to disconnect the communication path upon the reception of the requested telephone number; and means for sending the received telephone number to said switching network to cause it to reestablish a communication path to said one remote terminal.

* * * * *